United States Patent
Porter et al.

(10) Patent No.: US 10,174,632 B2
(45) Date of Patent: Jan. 8, 2019

(54) BORESCOPE PLUG ASSEMBLY FOR GAS TURBINE ENGINE

(71) Applicant: United Technologies Corporation, Hartford, CT (US)

(72) Inventors: Steven D. Porter, Wethersfield, CT (US); David T. Feindel, Ellington, CT (US); Matthew Budnick, Tolland, CT (US); Conway Chuong, Manchester, CT (US)

(73) Assignee: United Technologies Corporation, Farmington, CT (US)

( * ) Notice: Subject to any disclaimer, the term of this patent is extended or adjusted under 35 U.S.C. 154(b) by 561 days.

(21) Appl. No.: 14/764,499

(22) PCT Filed: Jan. 31, 2014

(86) PCT No.: PCT/US2014/014116
§ 371 (c)(1),
(2) Date: Jul. 29, 2015

(87) PCT Pub. No.: WO2014/171994
PCT Pub. Date: Oct. 23, 2014

(65) Prior Publication Data
US 2016/0169032 A1    Jun. 16, 2016

Related U.S. Application Data

(60) Provisional application No. 61/759,811, filed on Feb. 1, 2013.

(51) Int. Cl.
*F01D 21/00* (2006.01)
*G02B 23/24* (2006.01)

(52) U.S. Cl.
CPC ........ *F01D 21/003* (2013.01); *F05D 2260/80* (2013.01); *F05D 2260/83* (2013.01); *G02B 23/2476* (2013.01)

(58) Field of Classification Search
CPC .... F01D 21/003; F01D 25/12; F05D 2260/80; F05D 2260/83; F05D 2240/11; F05D 2230/72; F05D 2250/232; F05D 2250/241; G02B 23/2476; F02C 3/067; Y02T 50/67; Y02T 50/675
USPC ................................ 415/118, 177; 29/889.2
See application file for complete search history.

(56) References Cited

U.S. PATENT DOCUMENTS

| | | |
|---|---|---|
| 5,115,636 A | 5/1992 | Zeiser |
| 5,431,534 A | 7/1995 | Charbonnel |
| 2007/0130767 A1 | 6/2007 | McCooey et al. |
| 2010/0132370 A1 | 6/2010 | Durocher et al. |
| 2010/0135770 A1* | 6/2010 | Durocher ............... F01D 9/065 415/69 |
| 2010/0215477 A1 | 8/2010 | Wilson |
| 2013/0259646 A1 | 10/2013 | Feindel et al. |

OTHER PUBLICATIONS

EP search report for EP14786006 dated May 12, 2016.

\* cited by examiner

*Primary Examiner* — Mark Laurenzi
*Assistant Examiner* — Mickey France
(74) *Attorney, Agent, or Firm* — O'Shea Getz P.C.

(57) ABSTRACT

A borescope plug assembly includes a borescope plug having a shaft section and a tip section, a bushing engageable with the shaft section and a seal engageable with the tip section.

20 Claims, 9 Drawing Sheets

BORESCOPE PLUG ASSEMBLY FOR GAS TURBINE ENGINE

This application claims priority to PCT Patent Application No. PCT/US14/14116 filed Jan. 31, 2014, which claims to U.S. patent application Ser. No. 61/759,811 filed Feb. 1, 2013.

BACKGROUND

The present disclosure relates to a gas turbine engine and, more particularly, to a borescope plug assembly therefore.

Borescope inspection ports facilitate on-wing inspection of aircraft engine primary gaspath hardware with a fiber optic borescope to expedite frequent engine inspections that otherwise may require disassembly. During engine operation borescope plugs seal the inspection ports on the engine to minimize secondary flow leakage into the primary gaspath. As the borescope access inspection port typically penetrates an inner and outer engine case some allowance may be accorded for variation such that the inspection ports may be larger than otherwise required for borescope access. This increased size may aggravate airflow disruption and leakage.

SUMMARY

A borescope plug assembly according to one disclosed non-limiting embodiment of the present disclosure includes a borescope plug having a shaft section and a tip section, a bushing engageable with said shaft section, and a seal engageable with said tip section.

In a further embodiment of the foregoing embodiment, the tip section includes a semi-spherical tip.

In a further embodiment of any of the foregoing embodiments, the tip section defines a diameter less than said shaft section.

In a further embodiment of any of the foregoing embodiments, the seal defines an outer diameter less than said bushing.

In a further embodiment of any of the foregoing embodiments, the seal defines an inner diameter less than said bushing.

In a further embodiment of any of the foregoing embodiments, the tip section and an inner aperture of said seal define an approximate 0.005 (0.127 mm) radial gap.

A gas turbine engine according to another disclosed non-limiting embodiment of the present disclosure includes a multiple of bosses in a gas turbine engine structure, at least one of said bosses defines a borescope boss, said borescope bore having a through bore having an internal step, a bushing mounted in said bore axially displaced from said internal step, and a seal mounted in said bore between said bushing and said internal step.

In a further embodiment of the foregoing embodiment, the gas turbine engine structure is a mid-turbine frame. In the alternative or additionally thereto, in the foregoing embodiment the mid turbine frame is mounted within an annular outer turbine exhaust case. In the alternative or additionally thereto, the foregoing embodiment includes a multiple of centering pins engaged with said multiple of bosses. In the alternative or additionally thereto, the foregoing embodiment includes a borescope plug mountable within said borescope boss.

In a further embodiment of any of the foregoing embodiments, the seal is movable off an axis defined by said borescope bore. In the alternative or additionally thereto, the foregoing embodiment includes a borescope plug mountable within said borescope boss. In the alternative or additionally thereto, in the foregoing embodiment the borescope plug includes a shaft section and a tip section, said tip section defines a diameter smaller than said shaft section. In the alternative or additionally thereto, in the foregoing embodiment the tip section includes a semi-spherical tip.

A method of sealing a borescope inspection port according to another disclosed non-limiting embodiment of the present disclosure includes interfacing a borescope plug upon a bushing to couple a first gas turbine engine structure to a second gas turbine engine structure, and interfacing the borescope plug upon a seal to provide sealing.

In a further embodiment of the foregoing embodiment, the method includes locating the bushing and seal in a borescope bore through one of a multiple of bosses. In the alternative or additionally thereto, in the foregoing embodiment the second gas turbine engine component is a mid-turbine frame. In the alternative or additionally thereto, in the foregoing embodiment the other of the multiple of bosses receives a support pin which extends through said first gas turbine engine component. In the alternative or additionally thereto, in the foregoing embodiment, the method includes permitting axial and radial movement of the seal within the borescope bore.

BRIEF DESCRIPTION OF THE DRAWINGS

Various features will become apparent to those skilled in the art from the following detailed description of the disclosed non-limiting embodiment. The drawings that accompany the detailed description can be briefly described as follows.

DETAILED DESCRIPTION

Figure 1:
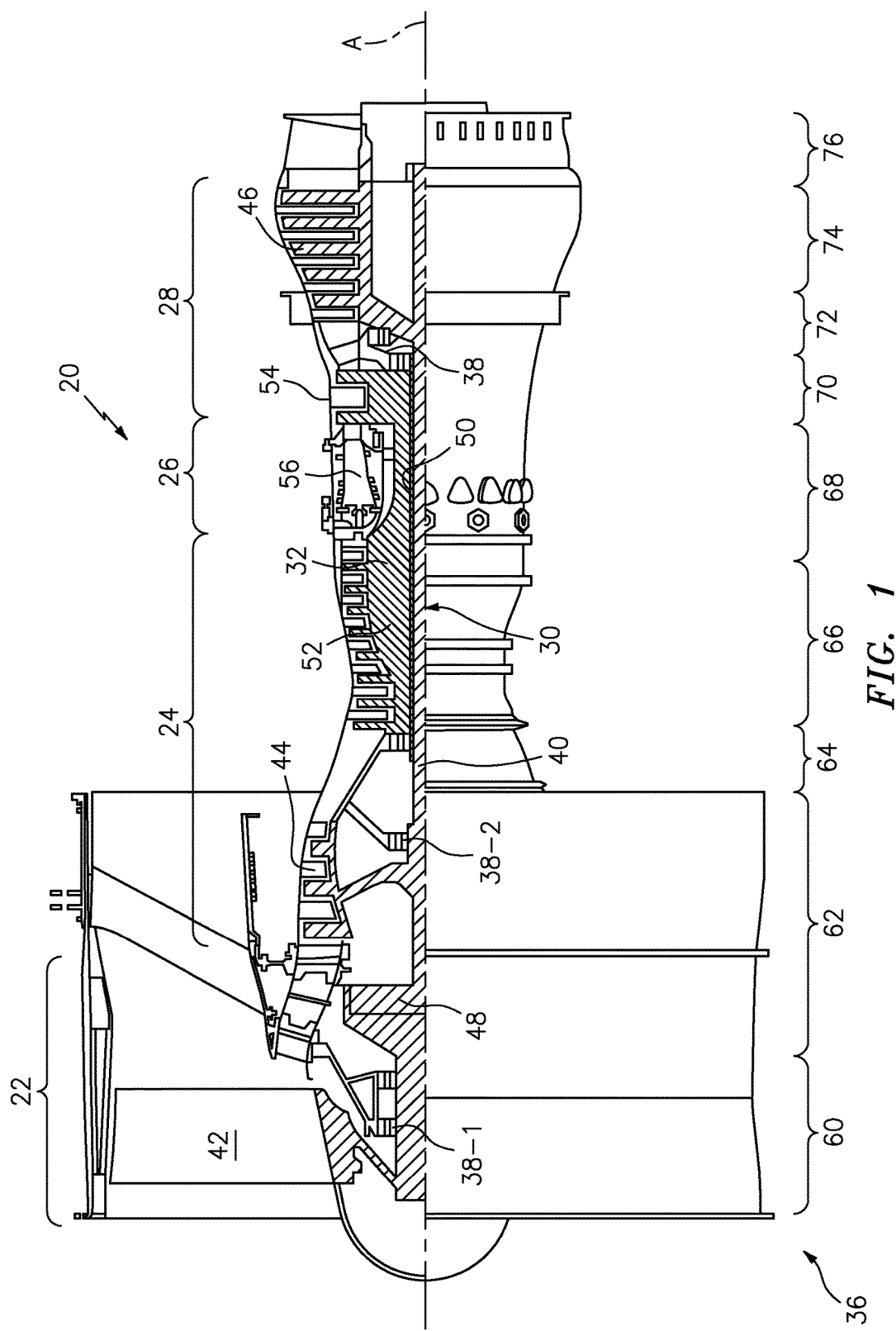
FIG. 1 is a schematic cross-sectional view of a geared architecture gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines architectures such as a low-bypass turbofan may include an augmentor section (not shown) among other systems or features. Although schematically illustrated as a turbofan in the disclosed non-limiting embodiment, it should be understood that the concepts described herein are not limited to use with turbofans as the teachings may be applied to other types of turbine engines to include but not limited to a three-spool (plus fan) engine wherein an intermediate spool includes an intermediate pressure compressor (IPC) between a low pressure compressor and a high pressure compressor with an intermediate pressure turbine (IPT) between a high pressure turbine and a low pressure turbine as well as other engine architectures such as turbojets, turboshafts, open rotors and industrial gas turbines.

The fan section 22 drives air along a bypass flowpath and a core flowpath while the compressor section 24 drives air along the core flowpath for compression and communication into the combustor section 26 then expansion through the turbine section 28. The engine 20 generally includes a low spool 30 and a high spool 32 mounted for rotation about an engine central longitudinal axis A relative to an engine case assembly 36 via several bearing compartments 38-1, 38-2, 38-3, 38-4. The bearing compartments 38-1, 38-2, 38-3, 38-4 in the disclosed non-limiting embodiment are defined herein as a forward bearing compartment 38-1, a mid-bearing compartment 38-2 axially aft of the forward bearing compartment 38-1, a mid-turbine bearing compartment 38-3 axially aft of the mid-bearing compartment 38-2 and a rear bearing compartment 38-4 axially aft of the mid-turbine bearing compartment 38-3. It should be appreciated that additional or alternative bearing compartments may be provided.

The low spool 30 generally includes an inner shaft 40 that interconnects a fan 42, a low-pressure compressor 44 ("LPC") and a low-pressure turbine 46 ("LPT"). The inner shaft 40 drives the fan 42 through a geared architecture 48 to drive the fan 42 at a lower speed than the low spool 30. The high spool 32 includes an outer shaft 50 that interconnects a high-pressure compressor 52 ("HPC") and high-pressure turbine 54 ("HPT"). A combustor 56 is arranged between the HPC 52 and the HPT 54. The inner shaft 40 and the outer shaft 50 are concentric and rotate about the engine central longitudinal axis A that is collinear with their longitudinal axes.

Core airflow is compressed by the LPC 44 then the HPC 52, mixed with the fuel and burned in the combustor 56, then expanded over the HPT 54 and the LPT 46. The HPT 54 and the LPT 46 drive the respective low spool 30 and high spool 32 in response to the expansion.

In one example, the gas turbine engine 20 is a high-bypass geared architecture engine in which the bypass ratio is greater than about six (6:1). The geared architecture 48 can include an epicyclic gear system 58, such as a planetary gear system, star gear system or other system. The example epicyclic gear train has a gear reduction ratio of greater than about 2.3, and in another example is greater than about 2.5 with a gear system efficiency greater than approximately 98%. The geared turbofan enables operation of the low spool 30 at higher speeds which can increase the operational efficiency of the LPC 44 and LPT 46 and render increased pressure in a fewer number of stages.

A pressure ratio associated with the LPT 46 is pressure measured prior to the inlet of the LPT 46 as related to the pressure at the outlet of the LPT 46 prior to an exhaust nozzle of the gas turbine engine 20. In one non-limiting embodiment, the bypass ratio of the gas turbine engine 20 is greater than about ten (10:1), the fan diameter is significantly larger than that of the LPC 44, and the LPT 46 has a pressure ratio that is greater than about five (5:1). It should be understood, however, that the above parameters are only exemplary of one embodiment of a geared architecture engine and that the present disclosure is applicable to other gas turbine engines including direct drive turbofans.

In one non-limiting embodiment, a significant amount of thrust is provided by the bypass flow due to the high bypass ratio. The fan section 22 of the gas turbine engine 20 is designed for a particular flight condition—typically cruise at about 0.8 Mach and about 35,000 feet. This flight condition, with the gas turbine engine 20 at its best fuel consumption, is also known as bucket cruise Thrust Specific Fuel Consumption (TSFC). TSFC is an industry standard parameter of fuel consumption per unit of thrust.

Fan Pressure Ratio is the pressure ratio across a blade of the fan section 22 without a Fax Exit Guide Vane system. The low Fan Pressure Ratio according to one non-limiting embodiment of the example gas turbine engine 20 is less than 1.45. Low Corrected Fan Tip Speed is the actual fan tip speed divided by an industry standard temperature correction of ("T"/518.7)$^{0.5}$ in which "T" represents the ambient temperature in degrees Rankine. The Low Corrected Fan Tip Speed according to one non-limiting embodiment of the example gas turbine engine 20 is less than about 1150 fps (351 m/s).

Figure 2:
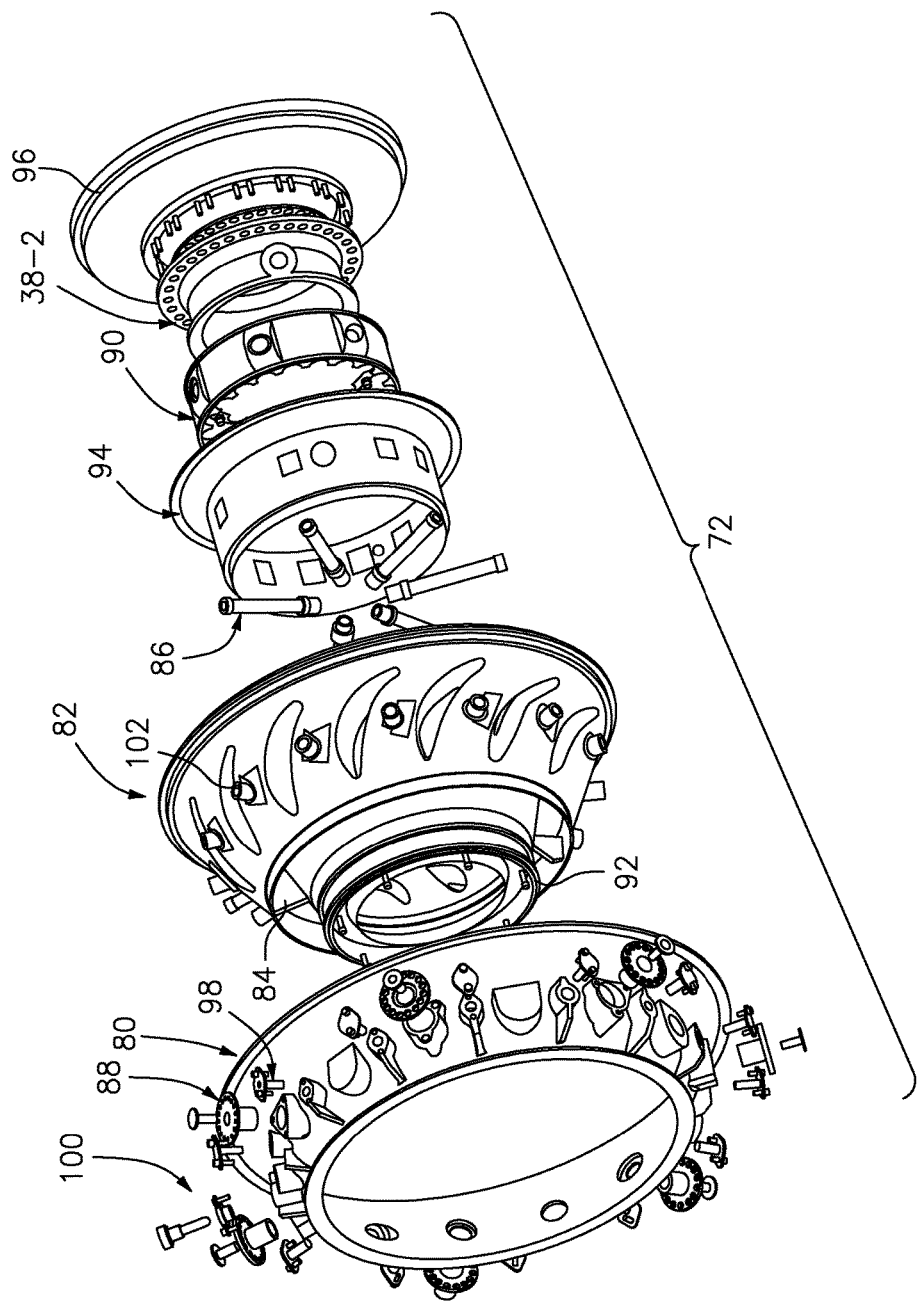
FIG. 2 is an exploded view of a Mid-Turbine Frame module.

With reference to FIG. 2, the engine case assembly 36 generally includes a multiple of modules to include a fan case module 60, an intermediate case module 62, a Low Pressure Compressor (LPC) module 64, a High Pressure Compressor (HPC) module 66, a diffuser module 68, a High Pressure Turbine (HPT) module 70, a mid-turbine frame (MTF) module 72, a Low Pressure Turbine (LPT) module 74, and a Turbine Exhaust Case (TEC) module 76. It should be understood that additional or alternative modules might be utilized to form the engine case assembly 36.

Figure 3:
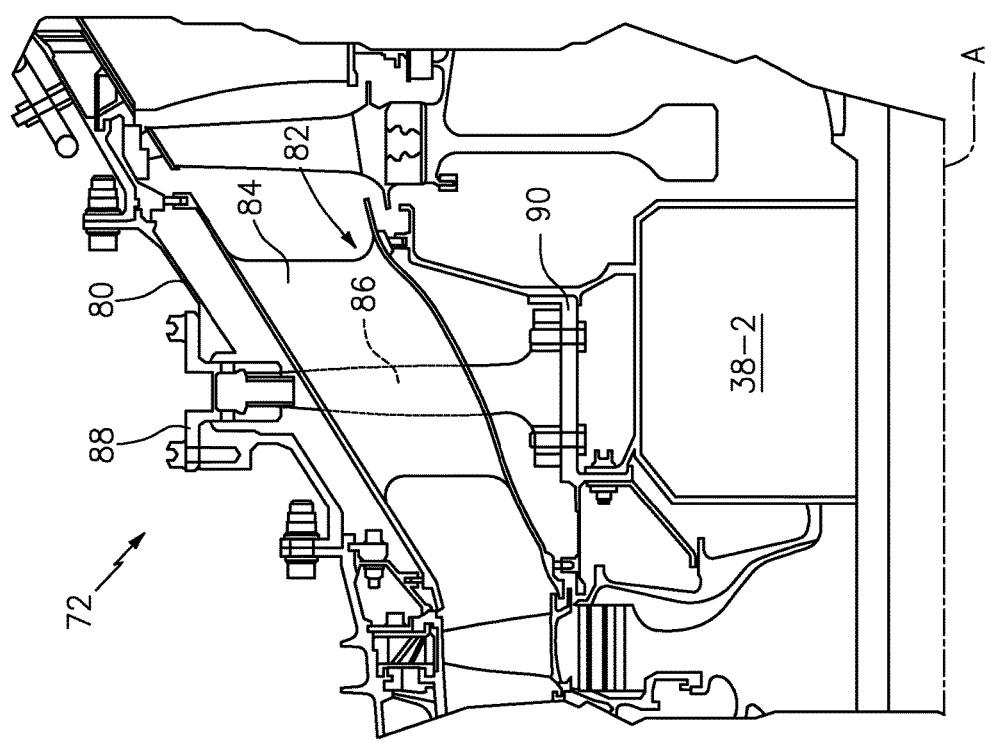
FIG. 3 is a cross-sectional view of the Mid-Turbine Frame module through a tie-rod.

With reference to FIG. 3, the MTF module 72 generally includes an annular outer turbine exhaust case 80, a mid-turbine frame (MTF) 82 which defines a multiple of stators 84, a multiple of tie rods 86, a multiple of tie rod nuts 88, an inner case 90, a HPT seal 92, a heat shield 94, a LPT seal 96, a multiple of centering pins 98 and a borescope plug assembly 100. The MTF module 72 supports the mid-bearing compartment 38-2 (illustrated schematically) through which the inner and outer shafts 40, 50 are rotationally supported. It should be appreciated that various other components may additionally or alternatively be provided within the MTF 82. Furthermore, the other modules that require borescope access will also benefit herefrom.

Figure 4:
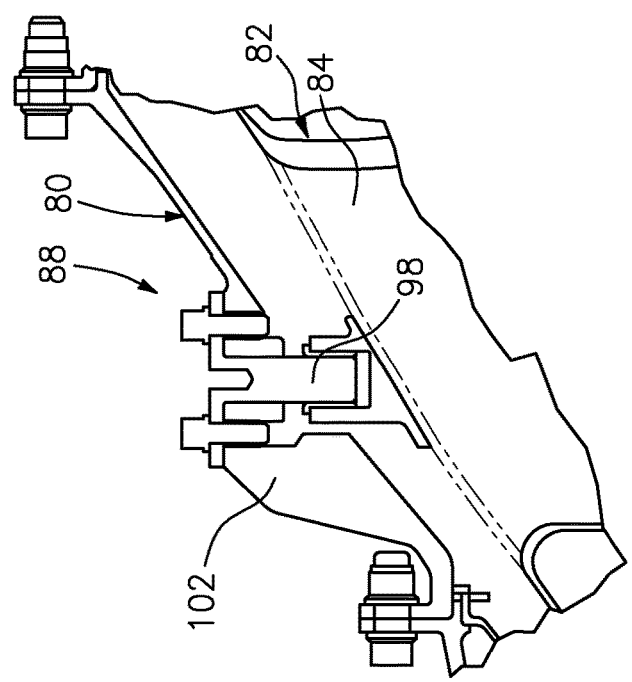
FIG. 4 is a cross-sectional view of the Mid-Turbine Frame module through a support pin.
Figure 5:
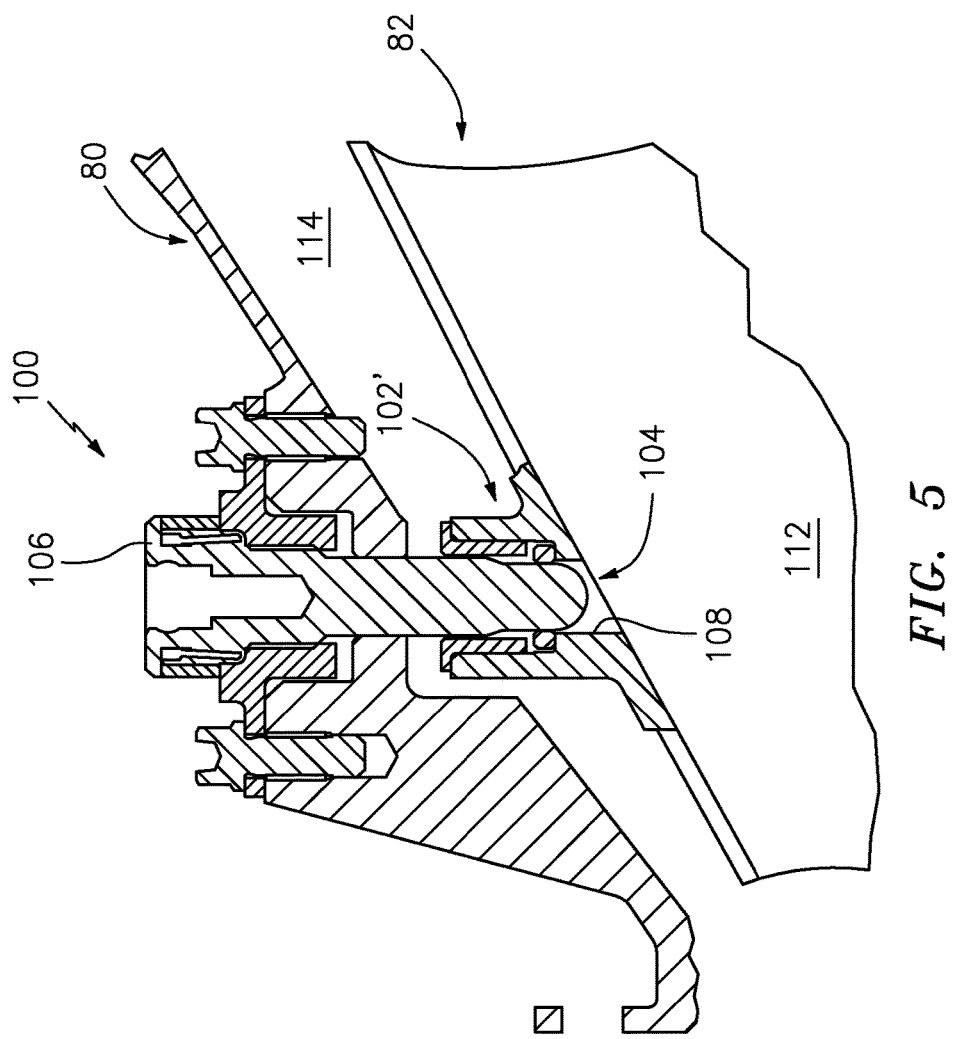
FIG. 5 is a cross-sectional view of the Mid-Turbine Frame module through a borescope pin assembly.

Each of the tie rods 86 are mounted to the inner case 90 and extend through a respective stators 84 to be fastened to the outer turbine exhaust case 80 with the multiple of tie rod nuts 88 (FIG. 4). That is, each tie rod 86 is sheathed by a stator 84 through which the tie rod 86 passes. The other stators 84 may alternatively or additionally provide other service paths. The multiple of centering pins 98 are circumferentially distributed between the stators 84 to engage bosses 102 on the MTF 82 to locate the MTF 82 with respect to the inner case 90 and the outer turbine exhaust case 80 (FIG. 5). It should be understood that various attachment arrangements may alternatively or additionally be utilized.

Figure 6:
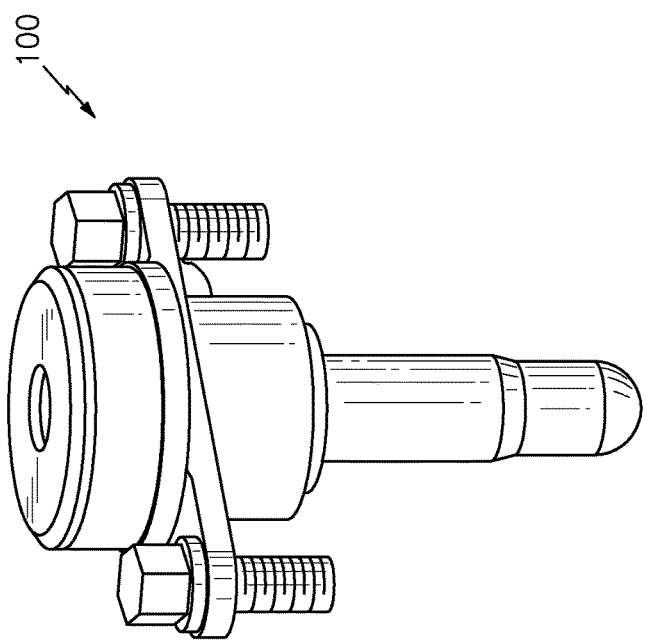
FIG. 6 is a perspective view of a borescope plug assembly.
Figure 7:
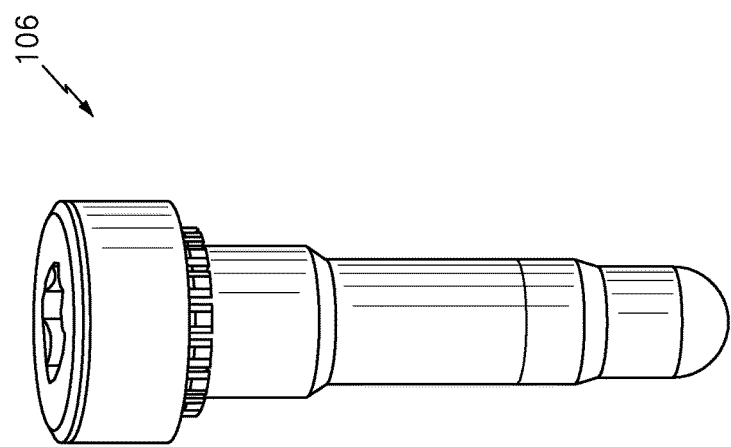
FIG. 7 is a perspective view of a borescope plug.

With reference to FIG. 6, the borescope plug assembly 100 utilizes one of the bosses 102 as a borescope boss 102' that defines a borescope inspection port 104 within which is removably fitted a borescope plug 106 (FIG. 7) that structurally replaces one of the centering pins 98. That is, the borescope plug 106 operates as a structural member of the load path between the annular outer turbine exhaust case 80 and the MTF 82. The borescope plug 106 provides the same structural positional features as do the centering pins 98 but is also removable for borescope inspection into the gas turbine engine 20 for on-wing inspections. Although the borescope plug assembly 100 is illustrated as located in the MTF module 72 in the disclosed non-limiting embodiment, it should be appreciated that the borescope plug assembly 100 may be located in other positions and in other engine modules 60-76.

The borescope inspection port 104 defines a bore 108 with an internal step 110. In contrast with the other bosses 102, the borescope boss 102' includes a through bore 108 that extends into communication with the primary gas path 112 of the engine 20. The borescope inspection port 104 is typically circumferentially located between two (2) stators 84 to facilitate the inspection of the upstream HPT and the downstream LPT with a borescope or other instrument.

The borescope boss 102' is located in a secondary flow passage 114 of the engine 20 through which a secondary airflow sourced, for example, from the compressor section 24 is communicated. It should be appreciated that the secondary airflow may be sourced from numerous locations and is defined herein as airflow different than the primary core airflow.

Whereas the secondary airflow is at a higher pressure than the core airflow which passes through the primary gas path 112 in the MTF 72, the secondary airflow tends to leak into the primary gas path 112 and thereby may reduce engine efficiency.

The borescope plug assembly 100 includes a seal 116 with an outer diameter small enough to fit within the bore 108 yet great enough to rest upon the internal step 110. The seal 116 includes an inner aperture 118 that closely fits around a tip section 120 of the borescope plug 106 to provide a tight tolerance gap to minimize the potential for leakage of secondary airflow into the primary gas path 112. The seal 116 may be manufactured of, for example, a cobalt or nickel alloy. Although illustrated in the disclosed non-limiting embodiment as a washer-like component, the seal 116 may alternatively include a piston seal, snap-ring, split seal or other annular structure which closely fits upon the tip section 120 yet provides movement within the hole 108 upon the step.

A bushing 122 is fitted within the bore 108 to axially retain the seal 116 as well as provide a close interface with a shaft section 124 of the borescope plug 106. That is, the seal 116 is trapped under the bushing 122 to provide a tight tolerance gap to reduce the leakage of cooling airflow into the core gaspath. The bushing 122 may be manufactured of, for example, Stellite 6B (AMS 5894). Furthermore, seal 116 is sized such that it is not subject to borescope plug 106 loads which may deform the seal; rather, borescope plug 106 loads are reacted by the bushing 122.

Figure 8:
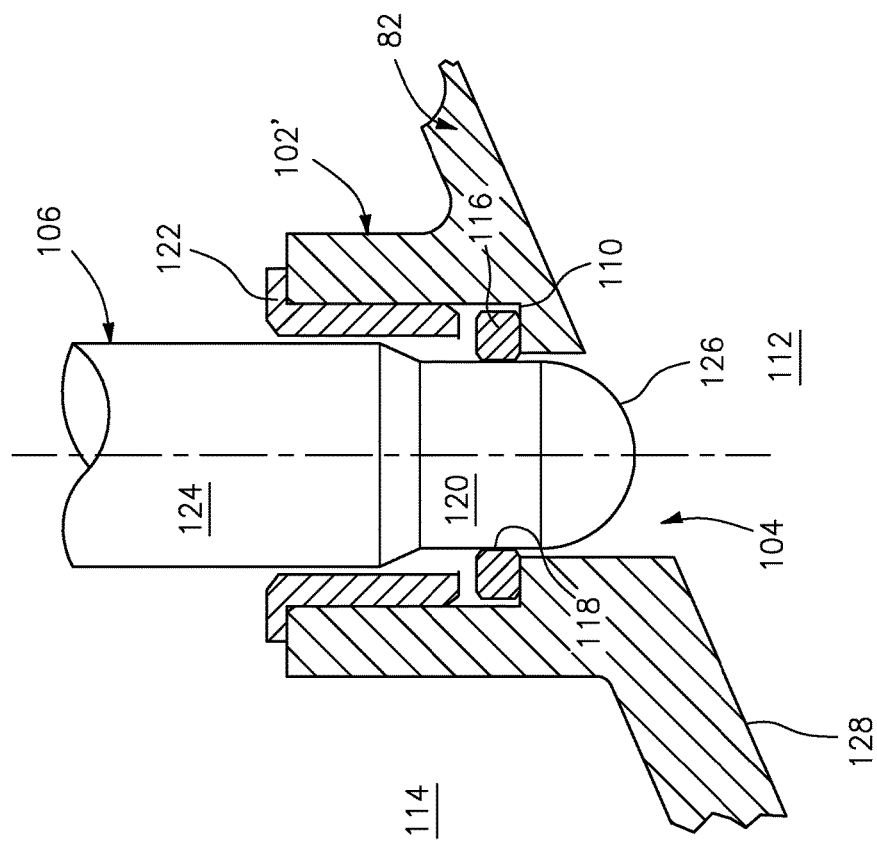
FIG. 8 is an expanded view of a tip section of the borescope plug within the MTF.
Figure 9:
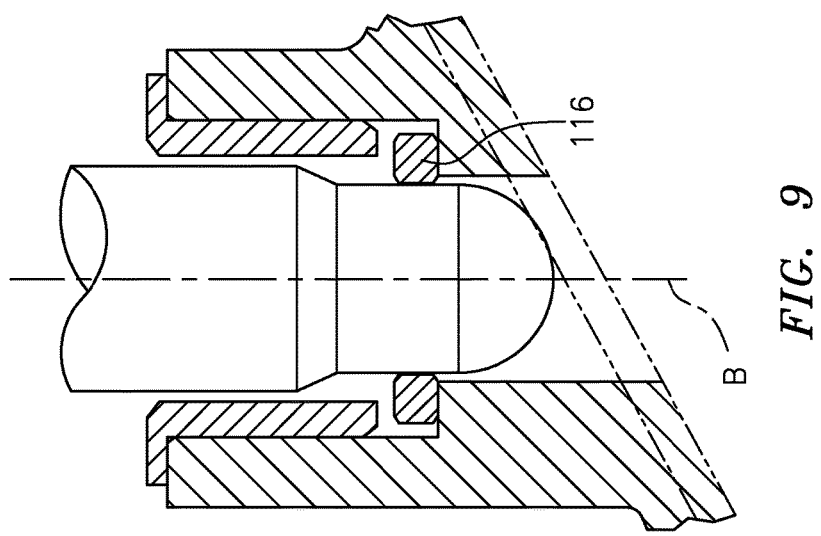
FIG. 9 is an expanded view of the tip section of the borescope plug within the MTF.
Figure 10:
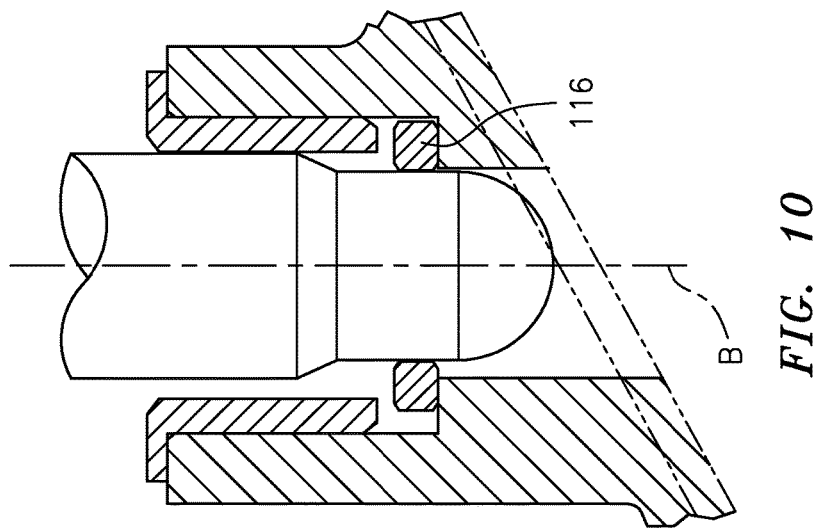
FIG. 10 is an expanded view of a tip section of the borescope plug shifted within the MTF.

The seal 116 is movable within the bore 108 with respect to a bore axis B as the inner aperture 118 interfaces with a semi-spherical tip 126 of the tip section 120 as the borescope plug 106 is inserted into the bore 108. That is, seal 116 shifts to receive the semi-spherical tip 126 to accommodate tolerances that may, for example, shift the MTF 82 with respect to the annular outer turbine exhaust case 80 (FIGS. 8 and 9). The seal 116 is also radially and axially movable within the bore 108 to accommodate thermal excursions during engine operation.

The smaller diameter of the tip section 120 as compared to the shaft section 124 minimizes the potential to bind or crush the seal 116 when the borescope plug is inserted and threaded into place. The smaller diameter of the tip section 120 as compared to the shaft section 124 also facilitates a relatively small diameter inner aperture 118 to minimize a radial gap. In one example, the shaft section 120 defines a diameter of 0.500 inches (12.7 mm); the tip section 120 defines a diameter of 0.430 inches (10.9 mm); the seal 116 defines an outer diameter of 0.648"+/−0.002 (16.5 mm); and the inner aperture 118 defines an inner diameter of 0.440+/−0.002 inches (11.2 mm) to provide a 0.005 (0.127 mm) radial gap.

The semi-spherical tip 126 is aligned with an inner surface 128 of the MTF 72 such that the semi-spherical tip 126 is essentially flush with the outer boundary of the primary gas path at a desired design point such as cruise and facilitate primary gas path flow. The borescope plug assembly 100 facilitates conservation of cooling air that must be allocated to the MTF 72 and thereby ultimately results in an increase in engine efficiency.

It should be understood that relative positional terms such as "forward," "aft," "upper," "lower," "above," "below," "bottom", "top", and the like are with reference to the normal operational attitude of the vehicle and should not be considered otherwise limiting.

It should be understood that like reference numerals identify corresponding or similar elements throughout the several drawings. It should also be understood that although a particular component arrangement is disclosed in the illustrated embodiment, other arrangements will benefit herefrom.

Although the different non-limiting embodiments have specific illustrated components, the embodiments of this invention are not limited to those particular combinations. It is possible to use some of the components or features from any of the non-limiting embodiments in combination with features or components from any of the other non-limiting embodiments.

Although particular step sequences are shown, described, and claimed, it should be understood that steps may he performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason the appended claims should be studied to determine true scope and content.

What is claimed is:

1. A borescope plug assembly comprising:
   a borescope plug having a shaft section and a tip section;
   a bushing engageable with said shaft section; and
   a seal engageable with said tip section,
   wherein said seal is movable axially and radially relative to said tip section.

2. The borescope plug assembly as recited in claim 1, wherein said tip section includes a semi-spherical tip.

3. The borescope plug assembly as recited in claim 1, wherein said tip section defines a diameter less than said shaft section.

4. The borescope plug assembly as recited in claim 1, wherein said seal defines an outer diameter less than said bushing.

5. The borescope plug assembly as recited in claim 1, wherein said seal defines an inner diameter less than said bushing.

6. The borescope plug assembly as recited in claim 1, wherein said tip section and an inner aperture of said seal define an approximate 0.005 (0.127 mm) radial gap.

7. A gas turbine engine comprising:
   a borescope plug;

a multiple of bosses in a gas turbine engine structure, at least one of said bosses defines a borescope boss, said borescope boss having a through bore having an internal step;

a bushing mounted in said bore axially displaced from said internal step; and a seal mounted in said bore between said bushing and said internal step, wherein said seal is movable axially and radially within said bore relative to a tip section of said borescope plug.

8. The gas turbine engine of claim 7, wherein said gas turbine engine structure is a mid-turbine frame.

9. The gas turbine engine of claim 8, wherein said mid turbine frame is mounted within an annular outer turbine exhaust case.

10. The gas turbine engine of claim 9, further comprising a multiple of centering pins engaged with said multiple of bosses.

11. The gas turbine engine of claim 10, wherein said borescope plug is mounted within said borescope boss.

12. The gas turbine engine of claim 7, wherein said borescope plug includes a shaft section and said tip section defines a diameter smaller than said shaft section.

13. The gas turbine engine of claim 7, wherein said tip section includes a semi-spherical tip.

14. A method of sealing a borescope inspection port comprising:

interfacing a borescope plug upon a bushing to couple a first gas turbine engine structure to a second gas turbine engine structure;

interfacing said borescope plug upon a seal to provide sealing; and permitting axial and radial movement of said seal relative to a tip section of said borescope plug.

15. The method as recited in claim 14, further comprising locating said bushing and seal in a borescope bore through one of a multiple of bosses.

16. The method as recited in claim 15, wherein said second gas turbine engine component is a mid-turbine frame.

17. The method as recited in claim 16, wherein the other of said multiple of bosses receive a support pin which extends through said first gas turbine engine component.

18. The gas turbine engine of claim 7, further comprising:
an outer turbine exhaust case;
an inner case; and
a multiple of centering pins,
wherein said gas turbine engine structure defines a multiple of stators, and
wherein said multiple of centering pins are circumferentially distributed between said stators to engage said bosses to locate said gas turbine engine structure with respect to said inner case and said outer turbine exhaust case.

19. The gas turbine engine of claim 7, further comprising:
an outer turbine exhaust case; and
an inner case,
wherein said borescope plug is a structural member of a load path between said outer turbine exhaust case and said gas turbine engine structure, and
wherein said borescope plug engages said borescope boss to locate said gas turbine engine structure with respect to said inner case and said outer turbine exhaust case.

20. The gas turbine engine of claim 13, wherein said semi-spherical tip is flush with an outer boundary of a primary gas path of the gas turbine engine.

* * * * *

UNITED STATES PATENT AND TRADEMARK OFFICE
CERTIFICATE OF CORRECTION

| | | |
|---|---|---|
| PATENT NO. | : 10,174,632 B2 | Page 1 of 1 |
| APPLICATION NO. | : 14/764499 | |
| DATED | : January 8, 2019 | |
| INVENTOR(S) | : Porter et al. | |

It is certified that error appears in the above-identified patent and that said Letters Patent is hereby corrected as shown below:

In the Specification

Column 4, Line 9, please delete "Fax" and insert --Fan--.

Column 6, Line 31, please delete "he" and insert --be--.

Signed and Sealed this
Fifth Day of March, 2019

Andrei Iancu
*Director of the United States Patent and Trademark Office*